(12) United States Patent
Koifman et al.

(10) Patent No.: US 10,205,903 B2
(45) Date of Patent: Feb. 12, 2019

(54) COMPACT READOUT CIRCUIT AND A METHOD FOR READING A PIXEL USING A COMPACT READOUT CIRCUIT

(71) Applicant: Analog Value LTD., Rishon Lezion (IL)

(72) Inventors: Vladimir Koifman, Rishon Lezion (IL); Tiberiu Galambos, Binyamina (IL); Anatoli Mordakhay, Hadera (IL)

(73) Assignee: ANALOG VALUE LTD., Rishon Lezion (IL)

( * ) Notice: Subject to any disclaimer, the term of this patent is extended or adjusted under 35 U.S.C. 154(b) by 101 days.

(21) Appl. No.: 15/338,471

(22) Filed: Oct. 31, 2016

(65) Prior Publication Data

US 2017/0118430 A1   Apr. 27, 2017

Related U.S. Application Data

(63) Continuation-in-part of application No. 14/923,678, filed on Oct. 27, 2015, now Pat. No. 9,930,278.

(60) Provisional application No. 62/249,423, filed on Nov. 2, 2015.

(51) Int. Cl.
*H04N 5/378* (2011.01)
*H04N 5/3745* (2011.01)

(52) U.S. Cl.
CPC ......... *H04N 5/378* (2013.01); *H04N 5/37455* (2013.01); *H04N 5/37452* (2013.01)

(58) Field of Classification Search
CPC . H04N 5/37452; H04N 5/37455; H04N 5/378
See application file for complete search history.

(56) References Cited

U.S. PATENT DOCUMENTS

2015/0163403 A1\* 6/2015 Wakabayashi ......... H04N 5/378
348/308

\* cited by examiner

*Primary Examiner* — Ahmed A Berhan
(74) *Attorney, Agent, or Firm* — Reches Patents

(57) ABSTRACT

A device comprising a pixel and a readout circuit, wherein the pixel is coupled to the readout circuit; wherein the readout circuit comprises a current control circuit and a comparator; wherein the current control circuit is configured to (a) charge the current control circuit to a pixel affected charge using at least a pixel affected current that is indicative of an electrical parameter of the pixel and (b) drain, based on the pixel affected charge, a current control circuit current during a comparison period; wherein the comparator is configured to compare, during the comparison period, between a pixel affected voltage and a reference signal that changes during the comparison period and to provide at least one pulse that has is indicative of a value of the pixel affected voltage.

24 Claims, 12 Drawing Sheets

COMPACT READOUT CIRCUIT AND A METHOD FOR READING A PIXEL USING A COMPACT READOUT CIRCUIT

CROSS REFERENCE TO RELATED APPLICATIONS

This application claims priority from U.S. provisional patent Ser. No. 62/249,423 filing date Nov. 2, 2015.

This application is a continuation in part of U.S. patent application Ser. No. 14/923,678 filing date Oct. 27, 2015.

The provisional patent and patent application mentioned above are incorporated herein by reference.

BACKGROUND

Contemporary image sensors employ 4T pixel array implementing correlated double sampling (CDS) and column parallel analog to digital converter (ADC) structures, usually based on ramp based time to digital implementations. Each column in this case contains (besides the digital register/counter) a comparator that records the cross of the sampled voltage (reset or exposure value) with a ramp voltage that is common to all columns.

There is a growing need to reduce the size and cost of pixels and ADC structures.

SUMMARY

According to an embodiment of the invention there may be provided a device that may include a device may include a pixel and a readout circuit, wherein the pixel may be coupled to the readout circuit. The readout circuit may include a current control circuit and a comparator. The current control circuit may be configured to (a) charge the current control circuit to a pixel affected charge using at least a pixel affected current that may be indicative of an electrical parameter of the pixel and (b) drain, based on the pixel affected charge, a current control circuit current during a comparison period. The comparator may be configured to compare, during the comparison period, between a pixel affected voltage and a reference signal that changes during the comparison period and to provide at least one pulse that has may be indicative of a value of the pixel affected voltage. The pixel affected current is a current that is affected by an electrical parameter of the pixel. For example the pixel affected current may be provided by the pixel, may represent a portion of a current that is provided by the pixel, and the like. The pixel affected voltage is a voltage current that is affected by an electrical parameter of the pixel, may represent a reset value and/or an exposed value of the pixel.

The readout circuit may be coupled to a pulse width to digital converter may be configured to output a digital output signal that may be responsive to a width of the pulse; wherein the width of the pulse may be indicative of the value of the pixel affected voltage.

The readout circuit may be configured to be charged to the pixel affected charge without storing a voltage of the pixel.

The electrical parameter of the pixel may be an electrical parameter of a pixel source follower transistor of the pixel.

The electrical parameter of the pixel may be a threshold voltage of a pixel source follower transistor of the pixel.

The current memory transistor may be preceded by a first bias cascode transistor that may be coupled in parallel to the comparator transistor and a second bias cascode transistor that may be coupled in parallel to the comparator bias transistor.

The device may include a first bias current source; wherein the current control circuit may be configured to charge the current control circuit to the pixel affected charge using the pixel affected current and a first bias current supplied by the first bias current source.

The current control circuit may be configured to charge the current control circuit to the pixel affected charge by a difference current that equals a difference between the pixel affected current and the first bias current.

The first bias current may have a fixed value.

The first bias current source may include a current mirror.

The pixel may belong to a column of pixels and wherein the device further may include an additional column of pixels and an additional readout circuit; wherein the additional readout circuit may be configured read the additional pixel.

The readout circuit may include a buffering transistor for buffering the column of pixels from the additional column of pixels.

The readout circuit may be coupled to the pixel via a buffering transistor that precedes the comparator and the current control circuit.

The readout circuit may be further coupled to the pixel via a first bias current source that may be configured to supply a first bias current of a fixed value.

The buffering transistor may be a source follower transistor.

The comparator may consist essentially of a comparator transistor and a comparator bias transistor; wherein the current control circuit may include a current memory transistor, a switch, one or more bias cascode transistors and a capacitor; and wherein the current memory transistor may be preceded by one or more bias cascode transistors.

The current control circuit may consist essentially of the current memory transistor, the one or more bias cascode transistors, the switch and the capacitor.

The current control circuit may include a second bias current source and a gain boost transistor.

The device may include a signal generator that may be configured to supply the reference signal to the readout circuit.

The reference signal may be a ramp that scans a range of ramp values during the comparison period.

The at least one pulse may be multiple pulses; wherein the reference signal may include multiple ramps that scan a range of ramp values during the comparison period; and wherein the multiple pulses correspond to the multiple ramps.

The at least one ramp of the multiple ramps has a different slope than another ramp of the multiple ramps.

The device may include multiple counters that are fed by different clock signals; wherein the multiple counters are configured to count the durations of the multiple pulses.

The comparator may include a comparator transistor and a comparator bias transistor; wherein the current control circuit may include a current memory transistor, a switch and a capacitor; and wherein the current memory transistor may be preceded by at least one bias cascode transistor.

According to an embodiment of the invention there may be provided a method for operating any device illustrated in the specification.

According to an embodiment of the invention there may be provided a method that may include (a) charging, by a current control circuit of the readout circuit, a current control circuit of the readout circuit to a pixel affected charge by using at least a pixel affected current that is indicative of an electrical parameter of the pixel, (b) draining, by the current control unit and based on the pixel affected charge, a current control circuit current during a comparison period, (c) comparing, by a comparator of the readout circuit and during the comparison period, between a pixel affected voltage and a reference signal that changes during the comparison period and to provide at least one pulse that has is indicative of a value of the pixel affected voltage, and (d) measuring the width of the at least one pulse.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
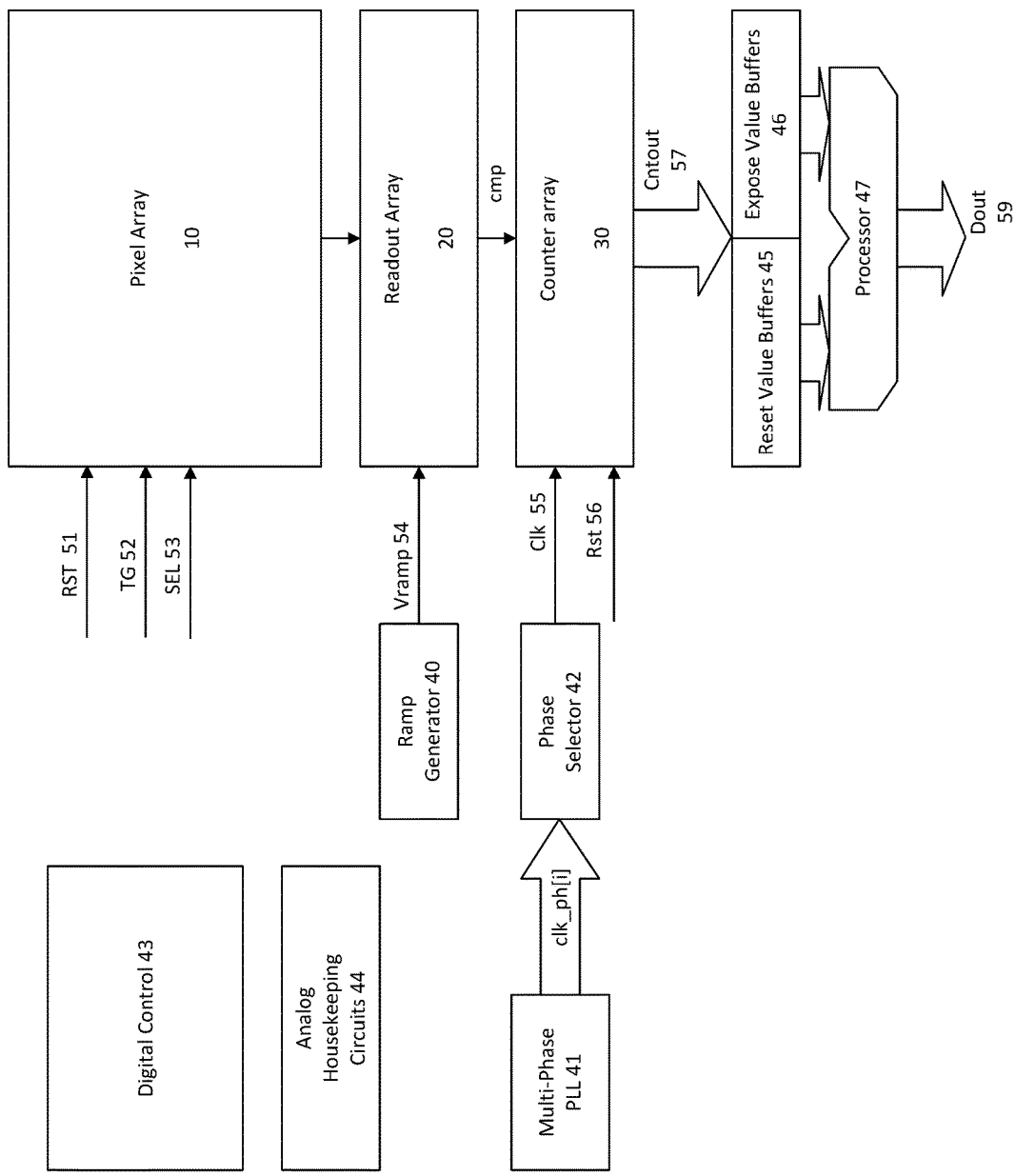
FIG. 1 is an example of a pixel array, a readout circuit as well as additional circuits.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device capable of executing the method.

Any reference in the specification to a device should be applied mutatis mutandis to a method that may be executed by the system.

According to various embodiment of the invention there is provided a device that includes a pixel and a readout circuit. In various figures (for example FIGS. 2, 4, 5, 6, 7, 10 and 11) a four-transistor pixel of a certain configuration is shown. This is merely an example of a pixel and any other pixel may be used. For example- pixels having more than four transistors and/or of any other configuration may be used. The device provides a compact readout circuit that may be compact (for example includes few transistors and small capacitor that does not need to store the voltage of the pixel).

FIG. 1 illustrates a device that includes a pixel array 10, readout array 20, counter array 20, reset value buffers 45, expose value buffers 46, processor 47, and additional circuits.

The device may be (or may be included within) an imager, a mobile phone, a security device, a camera, and the like.

The additional signals may include a signal generator such as a ramp generator 40, multiple clock signal generator such as a multi-phase phase locked loop PLL 41 followed by a clock signal selector such as phase selector 42 for selecting which selected clock signal (clk 55) will be used to feed the counter array 30.

Using multiple clock signals—especially phase shifted clock signals—and ramps of different slopes may improve the resolution (accuracy) of the measurement of the width of the one or more pulses outputted by the counters of the counter array.

For example—when the pulse generated by a readout circuit is very wide some of the counters will overflow and only some of the counter values may represent the width of a pulse. When the pulse generated by the readout is narrow then multiple counter values (obtained at different ramps) may represent the width of the pulse. Thus—in small pulse widths (representing small valued pixel information) the pulse width measurement may be more accurate. In large pulse widths, the noise associated with the pulse increases and there is no need to preform highly accurate measurements of the pulse width.

Any ramp generated by ramp generator 40 may be replaced by any other signal (linear, non-linear or a combination of both) that changes during the comparison period.

The additional circuits may also include reset value buffers 45, expose value buffers 46, processor 47, digital control block 43 and an analog housekeeping circuit 44. The digital control block generates timing control signals required by the device (signals such as reset RES, transfer TG, and discharge signals. The analog housekeeping circuit 44 generates all the analog reference voltages and currents required to bias the various circuits of the device.

The device applied a correlated double sampling that includes a reset sampling phase that occurs after the pixel is reset and an exposed sampling phase that occurs after photodiode information is outputted by the pixel.

During a reset sampling phase of a correlated double sampling iteration of a pixel, a readout circuit related to the pixel outputs one or more pulses having widths that convey information about the state of the pixel (for example the non-uniformity of the pixel—especially the threshold voltage of a source follower transistor of the pixel). A counter of the counter array 30 may count the widths of the one or more pulses.

During the exposed sampling phase of that correlated double sampling iteration the readout circuit related to the pixel outputs one or more pulses having widths that convey information about the information sensed by the pixel. A counter of the counter array 30 may count the widths of the one or more pulses. It should be noted that there may be provided a centralized counter and the comparator only triggers the latching of the counter value in a register in each column.

The reset value buffers 45 store counter values that measure the widths of the one or more pulse outputted by readout circuits during reset sampling phases.

The exposed value buffers 46 store counter values that measure the widths of the one or more pulse outputted by readout circuits during exposed sampling phases.

Processor 47 compares (for example subtracts) counter values stored in a reset value buffer and an exposed value buffer that relate to the same pixel and to a same iteration of the correlated double sampling to provide information about the radiation sensed by the pixel.

The processing in case of multi-ramp can be implemented so that in the large signal region where some of the counters are saturated should use larger increments for the counters that are still running. The processor may ignore counts of saturated counters.

The pixel array 10 may include multiple pixels that are arranged in columns and rows. A readout circuit may be allocated per column. Selection signals such as SEL 53 are used to select the row of pixels that are read by the readout circuits.

Figure 2:
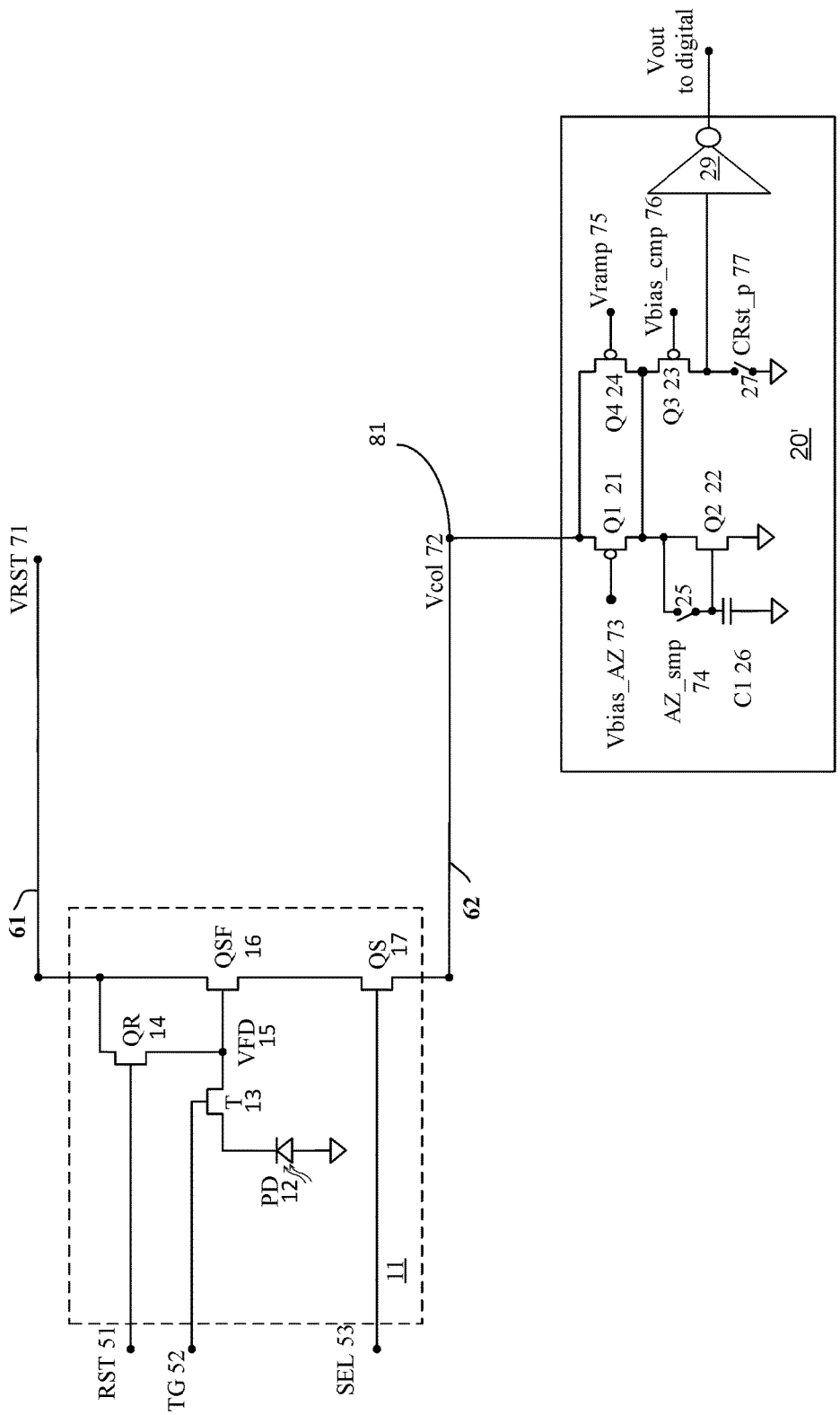
FIG. 2 is an example of a pixel, and a readout circuit.

FIG. 2 is an example of a pixel 11, a reset line 61, a column output line 62 and a readout circuit 20'. The reset line 61 and the column output line 62 may be modeled as a network of capacitors and resistors.

Pixel 11 is a four-transistor pixel that includes a photo-diode PD 12, a reset transistor QR 14, a select transistor QS 17, a transfer gate transistor T 13, and a source follower transistor QSF 16.

The gate of reset transistor 14 is fed by reset signals RST 51. The gate of transfer gate transistor T14 is fed by transfer gate signal TG 52.

The gate of select transistor TS 17 is fed by select signal SEL 53.

The drain of source follower transistor QSF 16 is coupled via reset line 61 to a reset voltage VREST 71.

The source of select transistor QS 17 is coupled via column output line 62 to an input node 81 of the readout circuit 20'.

Readout circuit 20' includes a current control circuit that includes current memory transistor Q2 22, first switch 25, storage capacitor C1 26. The current control circuit is preceded by bias cascode transistor Q1 21.

Bias cascode transistor Q1 separates between pixel domain and the current control circuit.

Readout circuit 20' also includes a comparator that includes comparator transistor Q4 24 and comparator bias transistor Q3 23 that may be a cascode bias transistor.

The drain of the comparator bias transistor Q3 23 is coupled via second switch 27 to the ground.

The first switch 25 is controlled by auto zero signal 73.

The second switch 27 is controlled by comparator reset signal CRst_p 77.

The gate of comparator transistor Q4 24 is fed by a reference signal such as Vramp 75 that changes over time.

Comparator transistor Q4, starts to conduct when Vramp 75 reaches a value that equals the column voltage Vcol 72 (the voltage at input node 81) minus the threshold voltage of Q4-Vth_Q4.

Readout circuit 20' outputs a pulse that starts when the comparator bias transistor Q3 23 is reset (grounded by second switch 27) and ends when comparator transistor Q4 starts to conduct.

Because comparator transistor Q4 starts to conduct when Vramp reaches Vcol-Vth_Q4—the width of the pulse is responsive to Vcol.

The gate of comparator bias transistor Q3 23 is fed with Vbias-cmp 76 that activates the comparator bias transistor when a comparison is required. The comparator is followed by a buffering circuit such as inverter 29.

The buffering circuit may be a non-inverting buffer or another dynamic pre-charged comparator stage.

In FIG. 2 the current memory transistor Q2 22 is an NMOS transistor while the bias cascode transistor Q1 21, the comparator transistor Q4 and the comparator bias transistor Q3 are PMOS transistors.

One end of the first switch 25 is connected to the drain of bias cascode transistor Q1 21, to the drain of current memory transistor Q2 22, to the drain of comparator transistor Q4 24 and to the source of comparator bias transistor Q3 23.

Another end of the first switch 25 is connected to the gate of current memory transistor Q2 22 and to one end of storage capacitor C1 26. The other end of storage capacitor C1 26 is grounded.

One end of second switch is connected to the drain of comparator bias transistor Q3 23, to the source of comparator transistor Q4 and to an input of inverter 29.

The sources of cascode transistor Q1 21, the comparator transistor Q4 are connected to input node 81.

Figure 3:
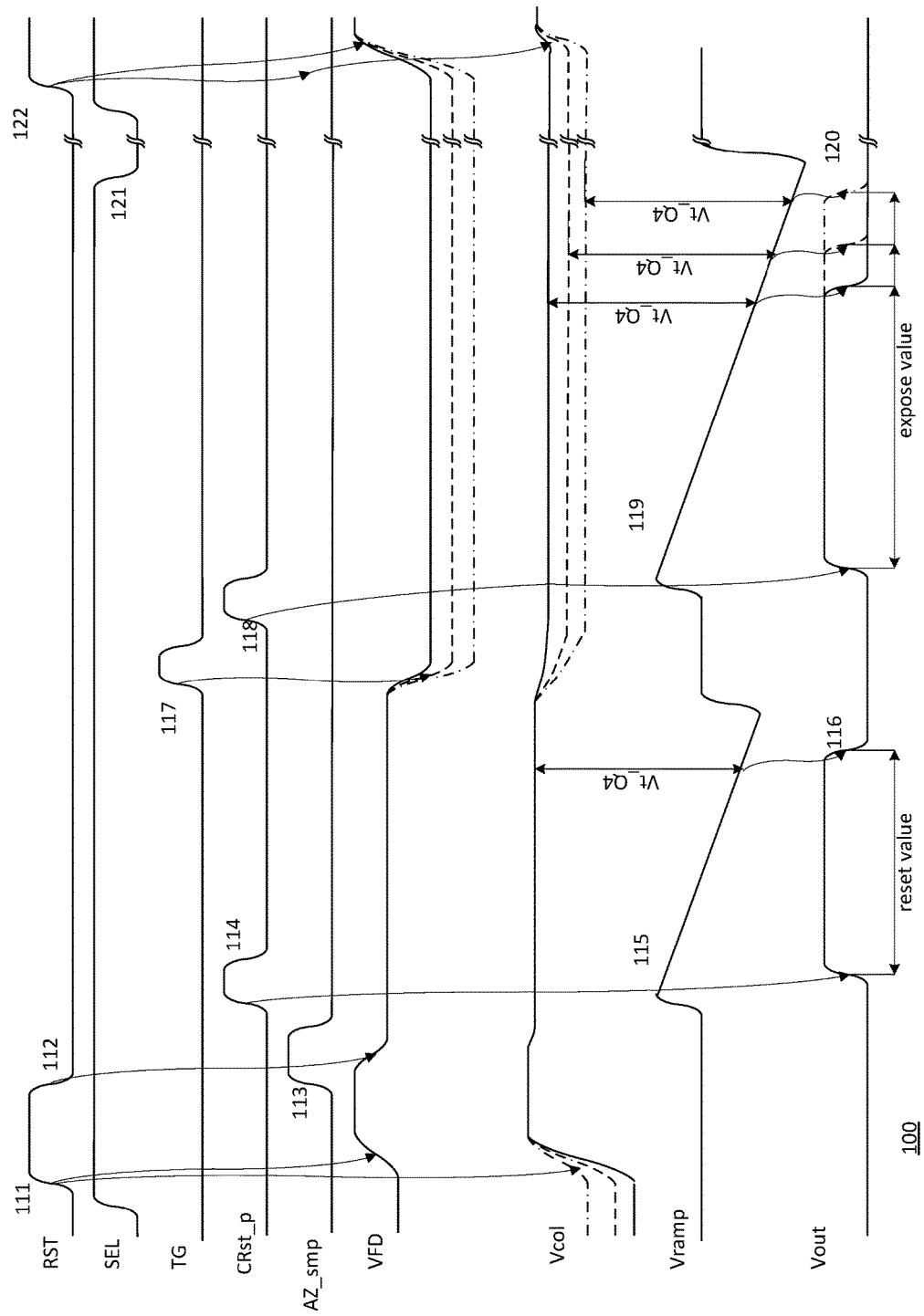
FIG. 3 is an example of a timing diagram illustrating the operation of the readout circuit and pixels of FIG. 2.

FIG. 3 is an example of a timing diagram illustrating the operation of the readout circuit and pixels of FIG. 2. FIG. 3 illustrates an iteration of a correlated double sampling related to pixel 11. FIG. 3 illustrates events 111-119 of various signals such as RST, SEL, TG, CRst_p, AZ_amp, VFD, Vcol, Vramp and Vout.

FIG. 3 illustrates the following operating sequence:
a. Pixel reset 111.
b. Charge injection at end of reset 112.
c. Auto Zero Sampling 113, pixel source follower non-uniformity related information is stored in the current memory transistor Q2.
d. Reset dynamic comparator 114.
e. Apply ramp 115.
f. When ramp voltage reaches Vcol—Vth_Q4, Q4 starts to conduct and triggers the dynamic comparator 116. At this point the reset value is represented as the pulse width.
g. At the pixel-transfer the exposure charge by applying pulse on transfer gate 117. Select line can be toggled for faster settling.
h. Reset the dynamic comparator for exposed value readout 118
i. Apply ramp 119
j. When ramp voltage reaches Vcol—Vth_Q4, Q4 starts to conduct and triggers the dynamic comparator 120. At this point the exposure value is represented as the pulse width.
k. Select signal goes low permitting readout of other lines 121 l. Pixel is reset again and the cycle starts again 122

Sequence steps a-f belong to a reset sampling phase while sequence steps h-l belong to an exposed sampling phase. Sequence steps e-f occur during a comparison period. Sequence steps i-j occur during another comparison period.

During sequence step c the current control circuit charges the current control circuit to a pixel affected charge a pixel affected current that is indicative of an electrical parameter of the pixel. During sequence steps e-f the current control circuit drains, based on the pixel affected charge, a current control circuit current. The pixel affected current is supplied by pixel 11. The pixel affected charge is the charge stored in storage capacitor at the end of sequence step c. The storage capacitor C1 26 is not required to store the voltage of the pixel—and thus can be smaller than capacitors or other devices that store this voltage—amounting in a compact readout circuit.

It should be noted that pulse 113 may be long enough to gain information about the electrical parameter of the pixel. Especially—given an expected range of conductivities (gm) of the source follower transistor QSF 16—that translate to delays—pulse 113 should be wide enough to cover the expected delays.

During the comparison period the comparator compares between a pixel affected voltage such as Vcol 72 and a reference signal (such as Vramp) that changes during the comparison period and to provide at least one pulse that has is indicative of a value of the pixel affected voltage.

Figure 4:
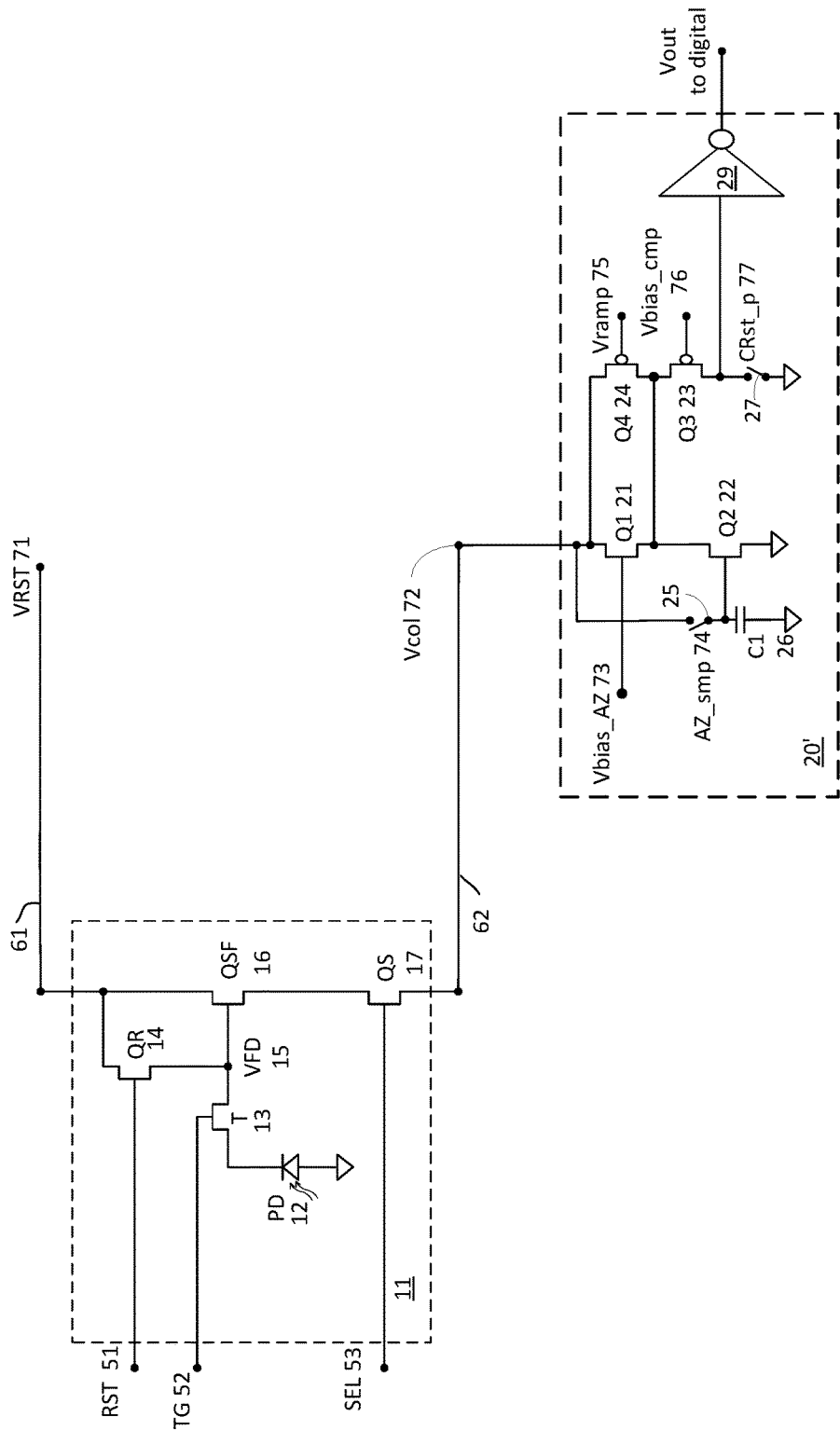
FIG. 4 is an example of a pixel, and a readout circuit.

FIG. 4 is an example of a pixel, and a readout circuit.

The readout circuit of FIG. 4 differs than the readout circuit of FIG. 2 by the connectivity of first switch 25 and the type (NMOS instead of PMOS) of bias cascode transistor Q1 21. The first switch 25 is now connected to the drain of bias cascode transistor Q1 21.

Figure 5:
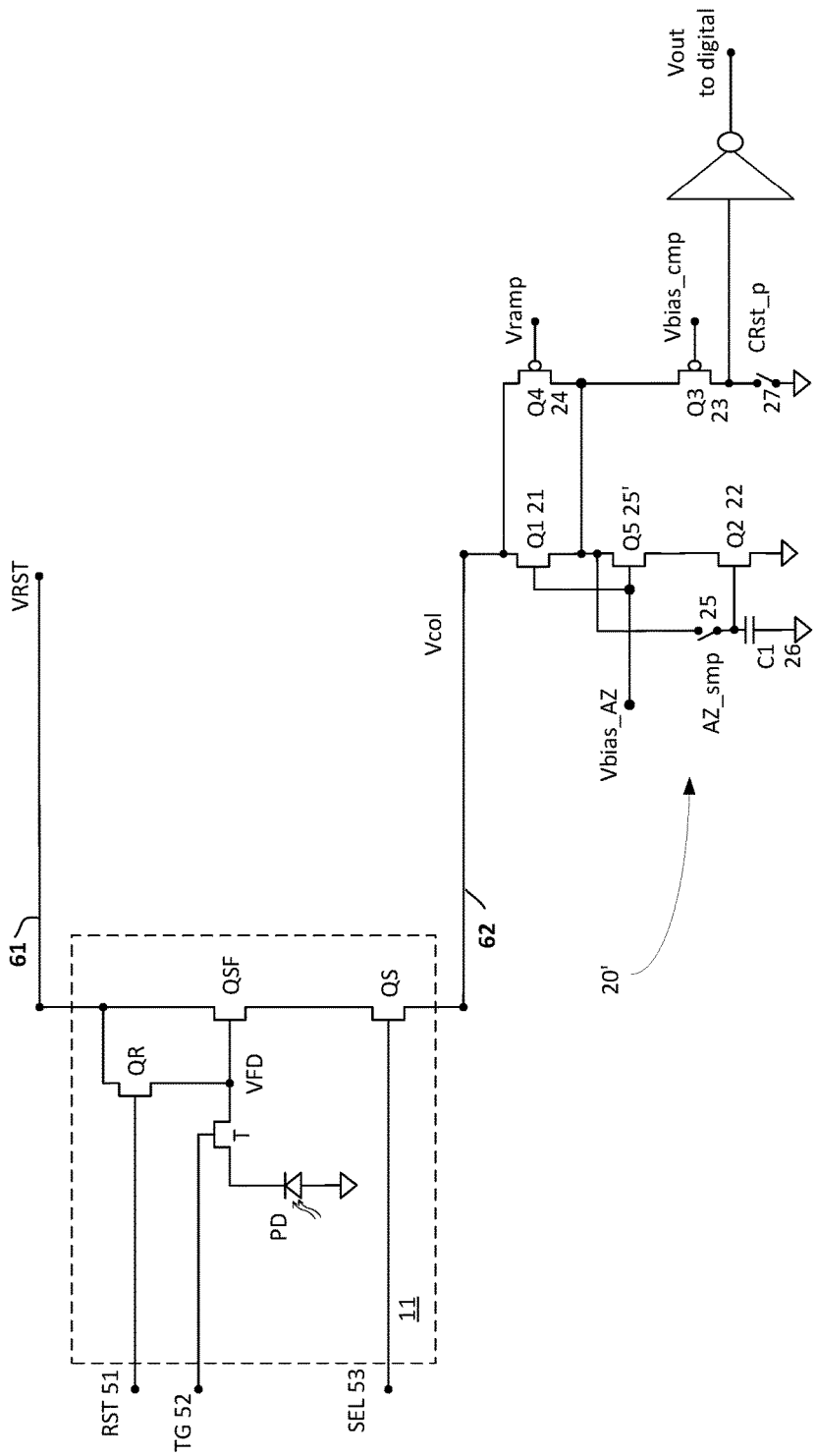
FIG. 5 is an example of a pixel, and a readout circuit.

FIG. 5 is an example of a pixel, and a readout circuit.

In FIG. 5 another bias cascode transistor was added.

Bias cascode transistor Q1 21 is connected in parallel to comparator transistor Q4. Second bias cascode transistor Q5 25 is connected between bias cascode transistor Q1 21 and current memory transistor Q2 22.

The drain of second bias cascode transistor Q5 25, the sources of comparator transistor Q4 and bias cascode transistor Q1 21 are connected to one end of first switch 25.

The source of second bias cascode transistor Q5 25 is connected to the drain of current memory transistor Q2 22.

The gates of second bias cascode transistor Q5 25 and bias cascode transistor Q1 21 are fed by Vbias_AZ.

By adding the second bias cascode transistor Q5 25 the current control circuit will continue to be cascoded also when comparator transistor Q4 conducts—as second bias cascode transistor Q5 25 in not coupled in parallel to comparator transistor Q4.

Figure 6:
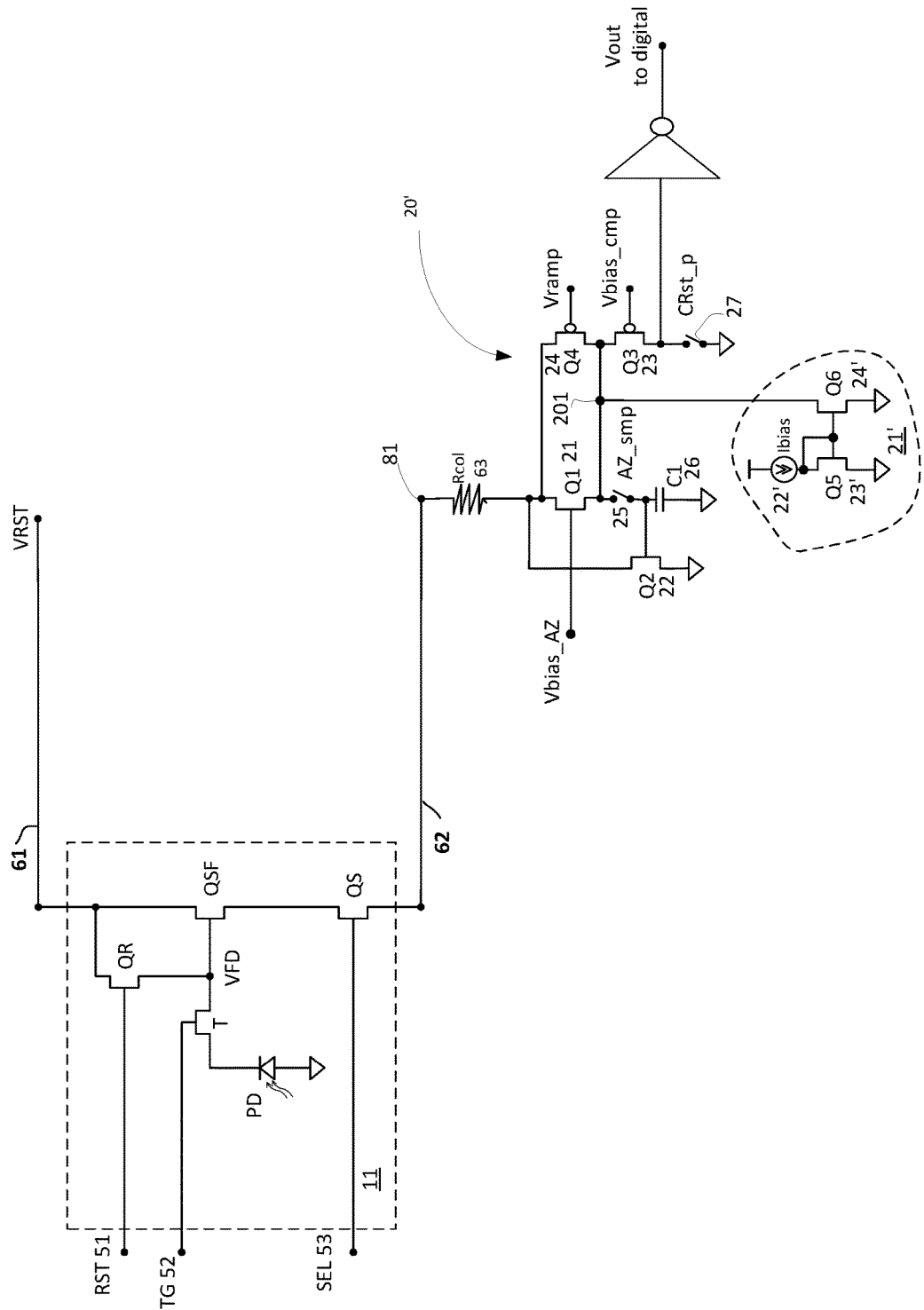
FIG. 6 is an example of a pixel, and a readout circuit.

FIG. 6 is an example of a pixel, and a readout circuit.

In this figure the current control circuit is fed by the pixel affected current and by a first bias current that is supplied by the first bias current source 21'. The first bias current may be fixed (have a fixed value).

The provision of the pixel affected current and the first bias current to the current control circuit may cause the storage capacitor C1 26 to be charged by a difference current that equals a difference between the pixel affected current and the first bias current.

In this case the storage capacitor C1 26 is expected to be charged by smaller values of current (difference current) and may store only a smaller portion of the current associated with the pixel to pixel non-uniformity. The current control circuit may be more sensitive to small changes in the value of the pixel affected current, have a smaller bandwidth, and the like.

The first bias current source 21' may include a bias source 22' for supplying a first bias current Ibias that is mirrored using a current mirror. In FIG. 6 the current mirror includes transistors Q5 23' and Q6 24'.

When the device includes multiple readout circuits (one per column) each of the readout circuits may be fed by a branch of the current mirror. Bias source 22' may feed all the branches.

In addition—FIG. 6 illustrates a resistor Rcol 63 that is serially connected between input node 81 and the readout circuit.

Rcol 63 provides separation of the pixel circuits and the column readout circuit and improves column to column mismatch.

Figure 7:
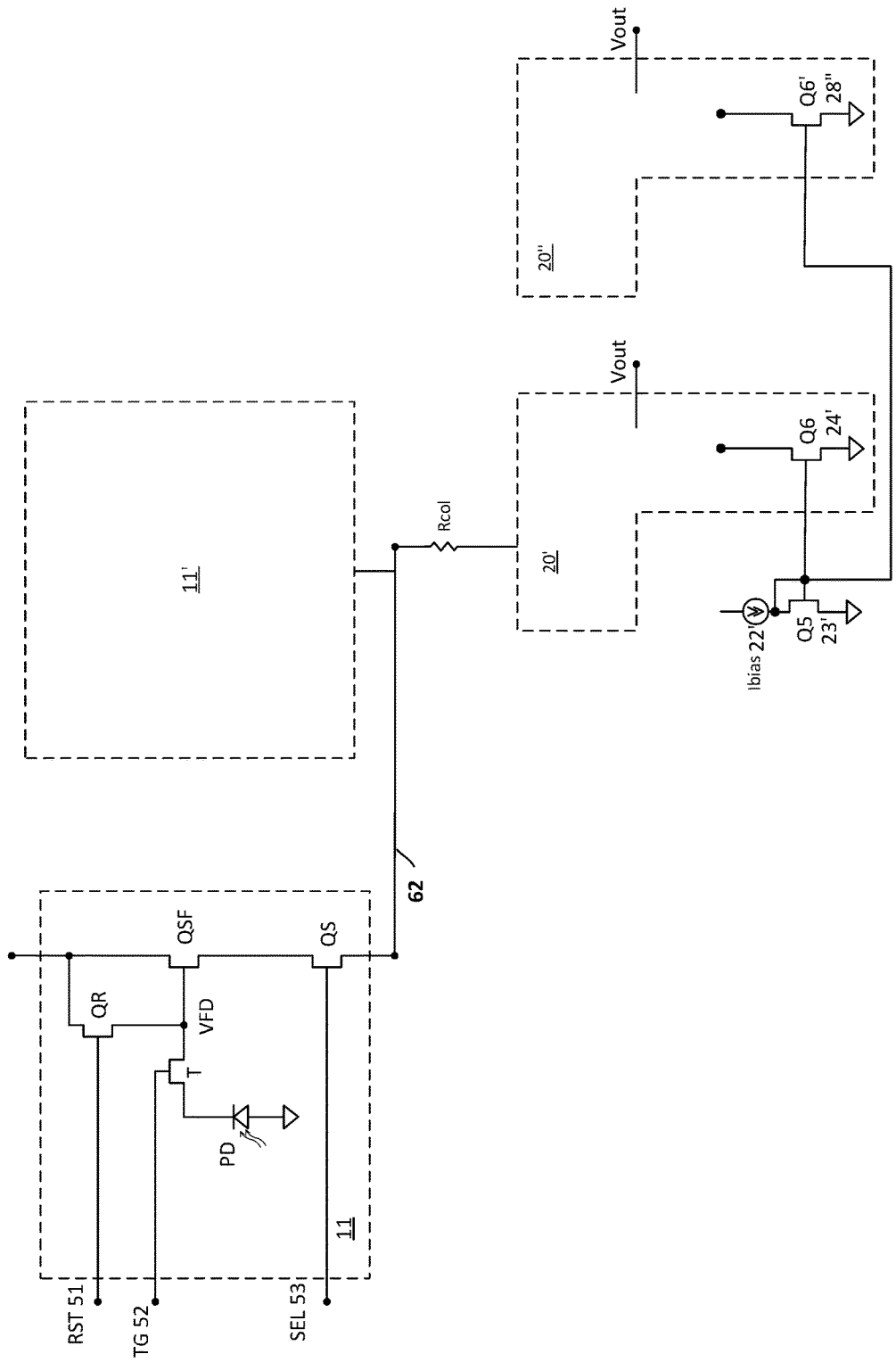
FIG. 7 is an example of two pixels of two different columns of pixels, and a pair of readout circuits.

FIG. 7 is an example of two pixels 11 and 11' of two different columns of pixels, reset line 61 and column output line 62 and a pair of readout circuits 20' and 20".

Readout circuit 20' is used for reading the pixels of a first column (that includes pixel 11). Readout circuit 20" is used for reading the pixels of a first column (that includes pixel 11').

FIG. 7 illustrates that two different branches of the current mirror are fed to readout circuits 20' and 20.

Figure 8:
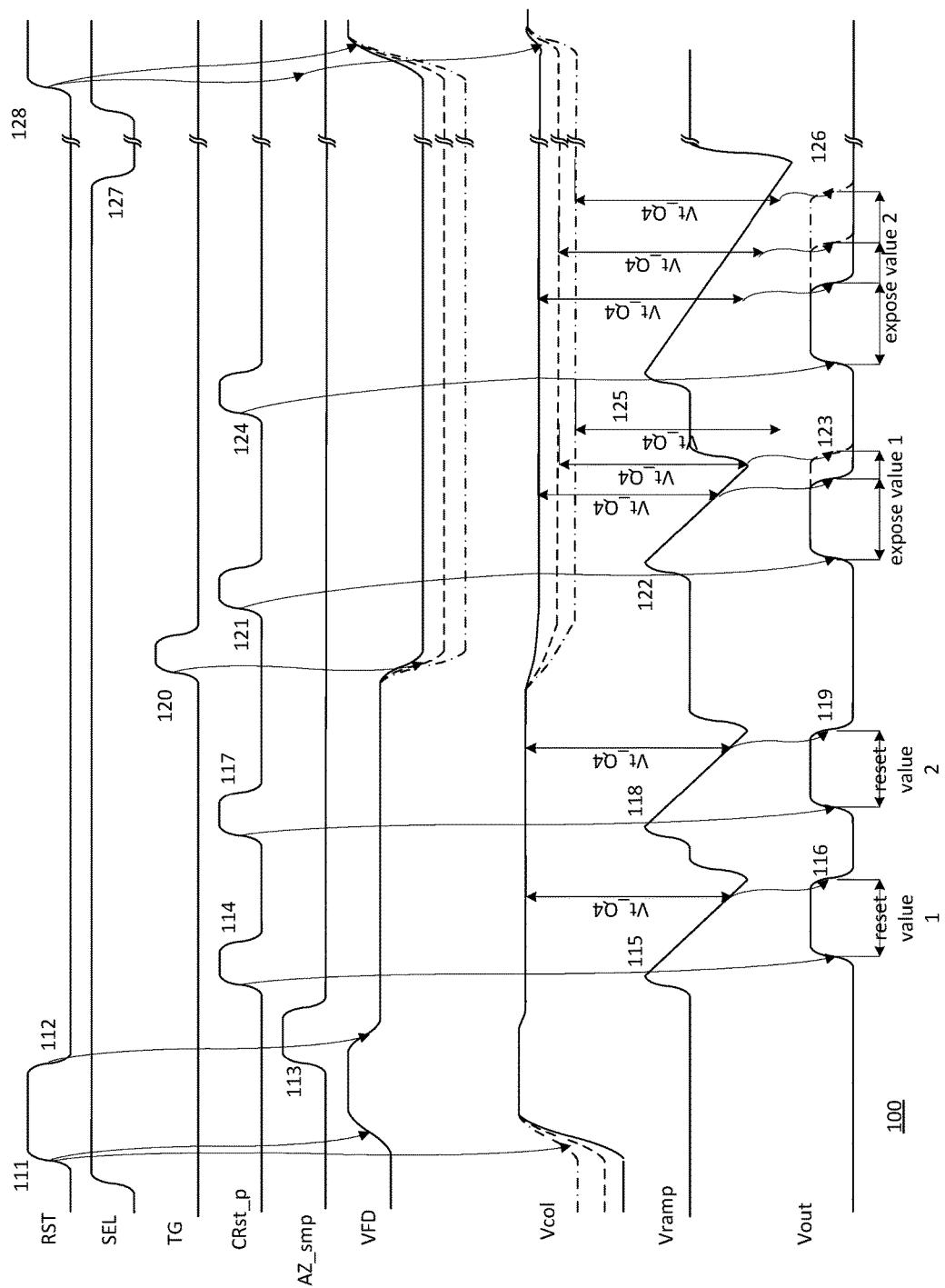
FIG. 8 is an example of a timing diagram illustrating the operation of the readout circuit and pixels of FIG. 7.

FIG. 8 illustrates an iteration of a correlated double sampling related to pixel 11. FIG. 8 illustrates events 111-128 of various signals such as RST, SEL, TG, CRst_p, AZ_amp, VFD, Vcol, Vramp and Vout.

Multi-ramp operation sequence
a. Pixel reset 111
b. Charge injection at end of reset 112
c. Auto Zero Sampling 113, pixel source follower non-uniformity related information is stored in the current memory transistor Q2
d. Reset dynamic comparator 114
e. Apply first reset readout ramp 115 related to clock phase 0
f. When ramp voltage reaches Vcol—Vth_Q4, Q4 starts to conduct and triggers the dynamic comparator 116. At this point the reset value is represented as the pulse width, at the resolution of the clock counter on phase 0.
g. Reset dynamic comparator 117
h. Apply second reset readout ramp 118 related to clock phase 1 (at 180 degrees from phase 0)
i. When ramp voltage reaches Vcol—Vth_Q4, Q4 starts to conduct and triggers the dynamic comparator 119. At this point the reset value is represented as the pulse width, at the resolution of the clock counter on phase 1. The sum of the two counter values represents the reset value at a resolution that is 1 bit better than a single ramp conversion performed at the same clock rate.
j. Transfer the exposure charge by applying pulse on transfer gate 120. Select line can be toggled for faster settling as shown in one of the simulations.
k. Reset the dynamic comparator for exposed value readout 121
l. Apply first exposure readout ramp 122 related to clock phase 0 and of the same length as the reset readout ramps.
m. When ramp voltage reaches Vcol—Vth_Q4, Q4 starts to conduct and triggers the dynamic comparator 123. At this point the exposure value is represented as the pulse width, at the resolution of the clock counter on phase 0. For low illumination, this is a real valid conversion but for high illumination the pulse will end at the end of the ramp (counter is built in a saturating fashion, avoiding wrap-around).
n. Reset dynamic comparator 124
o. Apply second exposure readout ramp 125 related to clock phase 1 (at 180 degrees from phase 0) and with a longer duration than the reset readout ramps.
p. When ramp voltage reaches Vcol—Vth_Q4, Q4 starts to conduct and triggers the dynamic comparator 126. At this point the exposure value is represented as the pulse width, at the resolution of the clock counter on phase 1. The summation of the two counter values (so as the part of the second exposure conversion that is more than the saturation value of the first counter is multiplied by 2) represents the reset value at a resolution that is 1 bit better than a single ramp conversion performed at the same clock rate for low exposure values (when the first short exposure ramp did not cause saturation of the counter) and at the same resolution as permitted by the clock rate for higher exposure values.
q. Select signal goes low permitting readout of other lines 127
r. Pixel is reset again and the cycle starts again 128

Figure 9:
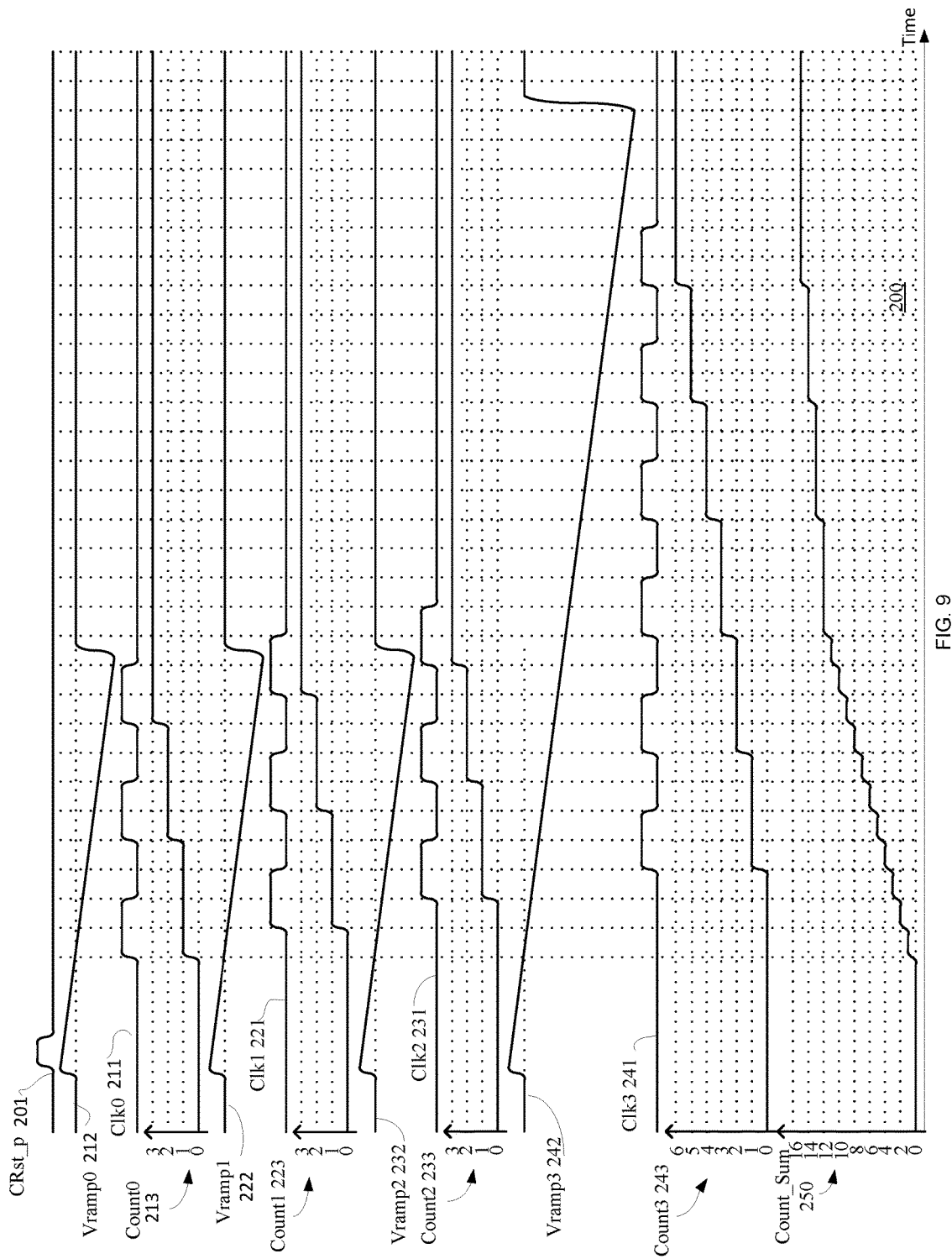
FIG. 9 provides examples of timing diagrams illustrating various signals generated during the operation of the readout circuit and pixels of FIG. 6 when fed, during a comparison period, with four ramps.

FIG. 9 provides examples of timing diagrams illustrating various signals generated during the operation of the readout circuit and pixels of FIG. 6 when fed, during a comparison period, with four ramps.

The figure shows four ramps Vramp0 212, Vramp1 222, Vramp2 232 and Vramp3 242, wherein Vramp0, Vramp1 and Vramp2 are short and Vramp3 is long. The slopes of the four ramps are identical to each other. All the ramps have the same alignment relative to the comparator reset pulse CRst_p.

There are also shown four clock signals (4 clock phases) Clk0 211, Clk1 221, Clk2 231 and Clk3 241 that are in quadrature (90 degrees phase difference). FIG. 9 also shows the values of four counters Count0 213, Count1 223, Count2 233 and Count3 243. Count0, Count1 and Count 2 saturate at value 3. Count3 is longer. Summing up the counters into digital signal Count_Sum 250 we get a piecewise linear ADC characteristic.

A digital processing block can then linearize this response by applying the following formula:

Lin_Out=Count_Sum if Count_sum<12.

Lin_Out=Count_Sum+3*(Count_Sum−12) if Count_sum>=12.

It should be mentioned that more complicated piece-wise linear characteristics can be created.

The same phase relationship can be implemented using the same clock for the 4 counters but introducing phase shifts between the ramps.

Figure 10:
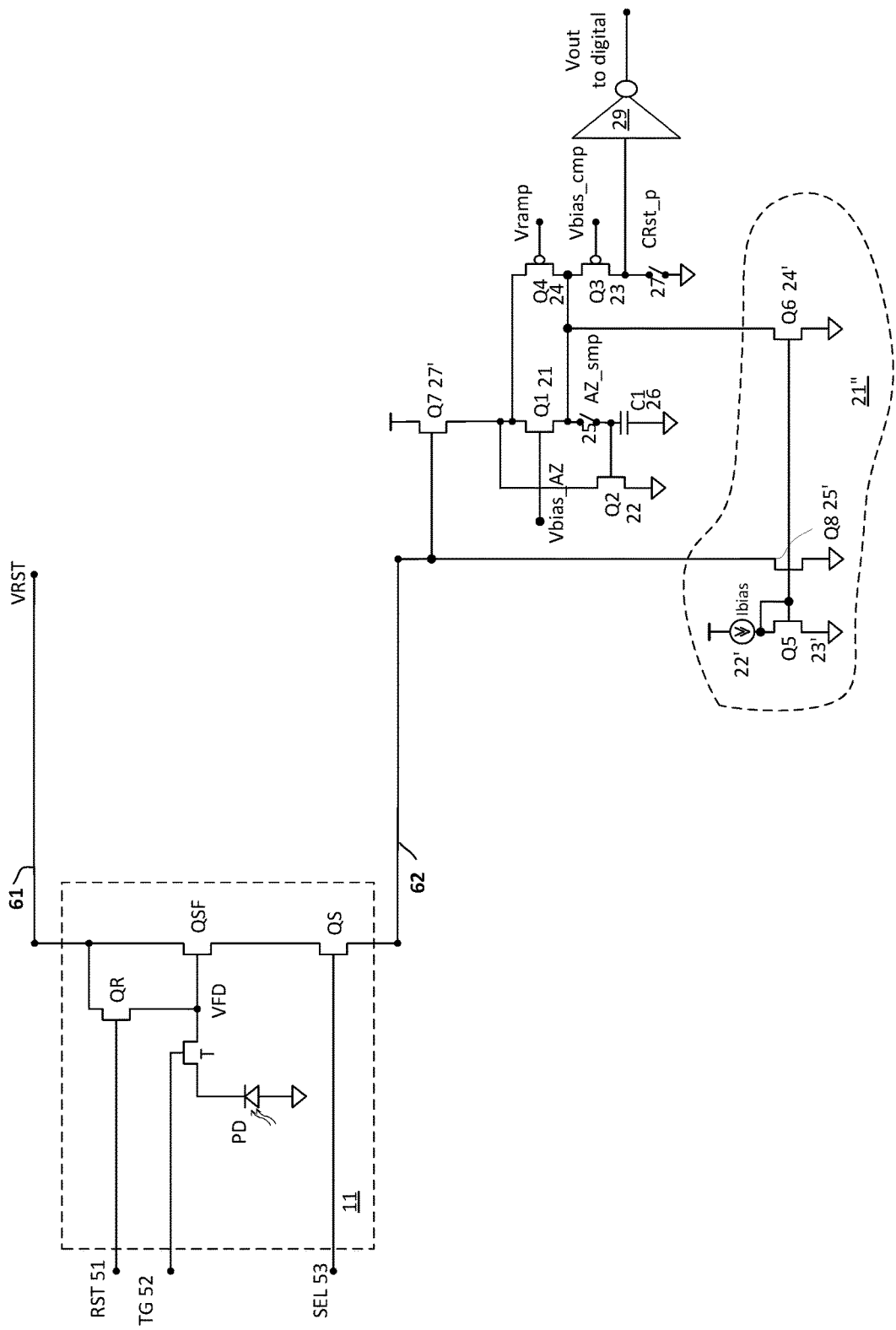
FIG. 10 is an example of a pixel, and a readout circuit.

FIG. 10 is an example of a pixel and a readout circuit.
The readout circuit of FIG. 10 differs from the readout circuit of FIG. 7 by including a buffering transistor Q7 27' for buffering the column of pixels from additional columns of pixels. In FIG. 10 the buffering transistor is a source follower transistor that has a gate that is connected to input node 81. The source of buffering transistor Q7 is connected to the drains of bias cascode transistor Q1 21 and comparator transistor Q4.

Input node 81 is also fed by a branch (Q8 25') of the current mirror of first bias current source 21'.

The gain of the conversion is determined by the slope of the ramp applied at Vramp. The lower the slope the higher the conversion gain.

For high gain implementations, the comparator decision may be encountered by enough kick-back noise that can couple into adjacent columns. In order to avoid this, the buffering transistor Q7 27' is provided. In addition—the column bias current is now constant and provided by Q8 25'.

Figure 11:
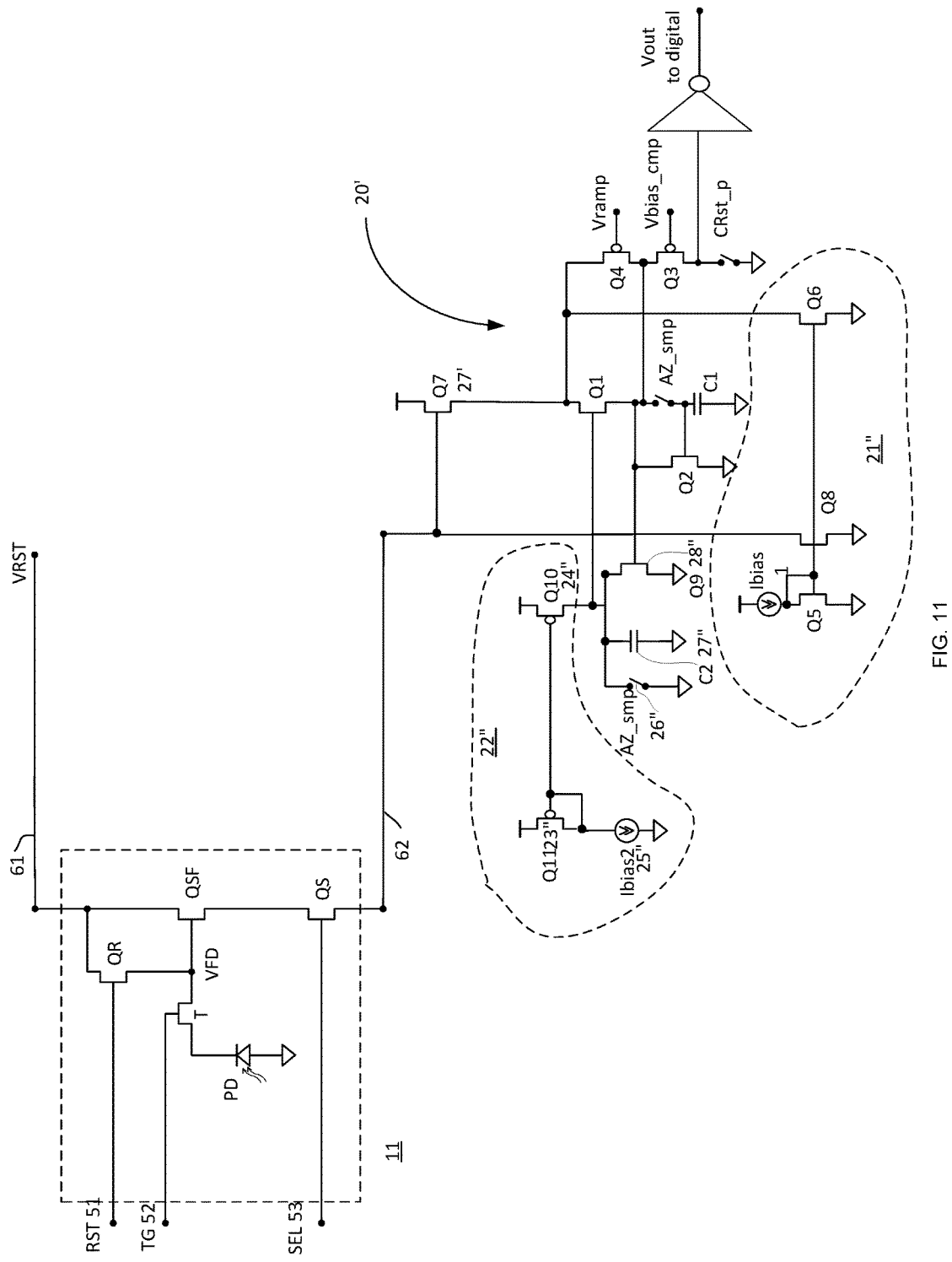
FIG. 11 is an example of a pixel, and a readout circuit.

FIG. 11 is an example of a pixel, and a readout circuit.
The readout circuit of FIG. 11 differs from the readout circuit of FIG. 10 by having a more robust current control circuit. The current control circuit based on current memory transistor Q2 22 can be further enhanced by making it into a gain boosted structure with the addition of gain boost transistor Q9 28" and a second bias current source 22" that include second bias source Ibias 25" and a current mirror that includes transistors Q10 24" and Q11 23" that drive the gate of bias cascode transistor Q1 21. The circuit formed by Q9 together with Q10 (and the associated mirror that can be shared between columns) is in fact a simple inverting amplifier (common source stage). The input (of the amplifier) is the gate of Q9, the output is the drain of Q9. Any other inverting amplifier topology can be used here, worth mentioning.

The readout circuit becomes self biased by this control loop.

There is also provided a second capacitor C2 27" that is parallel to third switch 26" and boost transistor Q9 28". The third switch 26" is controlled by AZ_amp and is needed in order to disable the control loop during the sampling of the column current by the current memory transistor Q2 22.

Figure 12:
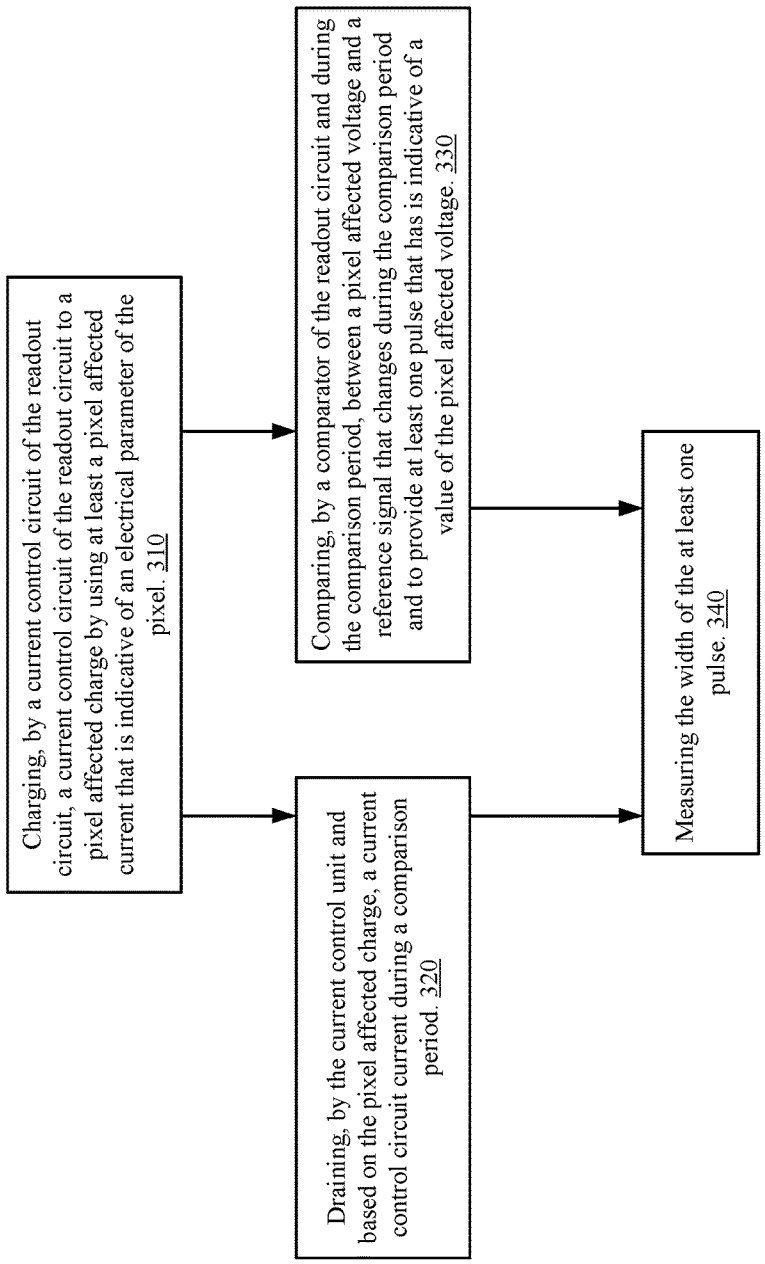
FIG. 12 illustrates an example of a method.

FIG. 12 illustrates method 300 according to an embodiment of the invention.

Method 300 is executed by a device that includes a pixel and a readout circuit. The device may include more than a single pixel and more than a single readout circuit. The readout circuit may include a current control circuit and a comparator.

Method 300 may start by step 310 of charging, by a current control circuit of the readout circuit, a current control circuit of the readout circuit to a pixel affected charge by using at least a pixel affected current that is indicative of an electrical parameter of the pixel. See, for example event 113 of FIG. 3.

Step 310 may include charging the readout circuit to the pixel affected charge without storing a voltage of the pixel. For example- without storing the source drain voltage of the source follower transistor of the pixel.

The electrical parameter of the pixel may be an electrical parameter of a pixel source follower transistor of the pixel. For example—the electrical parameter of the pixel may be a threshold voltage of a pixel source follower transistor of the pixel.

Step 310 may include charging the charge the current control circuit to the pixel affected charge using the pixel affected current and a first bias current that is supplied by a first bias current source. See, for example, FIGS. 6, 7, 10 and 11.

Step 310 may include charging the current control circuit to the pixel affected charge by a difference current that equals a difference between the pixel affected current and the first bias current. The first bias current may have a fixed value. The first bias current source may include a current mirror.

Step 310 may be followed by steps 320 and 330. See, for example, events 114 and 116 of FIG. 3.

Step 320 may include draining, by the current control unit and based on the pixel affected charge, a current control circuit current during a comparison period.

Step 330 may include comparing, by a comparator of the readout circuit and during the comparison period, between a pixel affected voltage and a reference signal that changes during the comparison period and to provide at least one pulse that has is indicative of a value of the pixel affected voltage.

The reference signal may be one or more ramps or any other time varying signal.

Step 330 may be executed by a comparator that may include a comparator transistor and a comparator bias transistor. The current control circuit may include a current memory transistor, a switch and a capacitor; and wherein the current memory transistor is preceded by at least one bias cascode transistor.

Steps 320 and 330 may be followed by step 340 of measuring the width of the at least one pulse.

Step 340 may be executed by a pulse width to digital converter that configured to output a digital output signal that is responsive to a width of each pulse of the at least one pulse. The width of the pulse is indicative of the value of the pixel affected voltage.

Method 300 may be executed by any of the devices illustrated in any one of the preceding figures.

The device may include multiple pixels and one or more readout circuit. For example, each readout circuit may be allocated to pixels of the same column. Pixels of the same column may be coupled in parallel to their allocated readout circuit. Multiple readout circuits may operate in parallel to each other.

The current memory transistor is preceded by a first bias cascode transistor that is coupled in parallel to the comparator transistor and a second bias cascode transistor that is coupled in parallel to the comparator bias transistor. Method 300 may include buffering a pixel and a readout circuit of certain column from other columns. The buffering may include using a buffering transistor. See, for example Q7 of FIGS. 10 and 11.

Method 300 may also include supplying to the column a first bias current by a first bias circuit.

The terms "comprising", "having", "consisting" and "essentially consisting" are be used in an interchangeable manner.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation; a single operation may be distributed in additional operations and operations may be executed at least partially overlapping in time. Moreover, alternative embodiments may include multiple instances of a particular operation, and the order of operations may be altered in various other embodiments.

Any reference to any of the terms "comprise", "comprises", "comprising" "including", "may include" and "includes" may be applied to any of the terms "consists", "consisting", "consisting essentially of". For example—any of the circuits illustrated in any figure may include more components that those illustrated in the figure, only the components illustrated in the figure or substantially only the components illustrated in the figure.

Also for example, in one embodiment, the illustrated examples may be implemented as circuitry located on a single integrated circuit. Alternatively, the examples may be implemented as any number of separate integrated circuits or separate common mode noise chokes interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A device comprising a pixel and a readout circuit, wherein the pixel is coupled to the readout circuit; wherein the readout circuit comprises a current control circuit and a comparator; wherein the current control circuit is configured to (a) charge the current control circuit to a pixel affected charge using at least a pixel affected current that is indicative of an electrical parameter of the pixel and (b) drain, based on the pixel affected charge, a current control circuit current during a comparison period; wherein the comparator is configured to compare, during the comparison period, between a pixel affected voltage and a reference signal that changes during the comparison period and to provide at least one pulse that has is indicative of a value of the pixel affected voltage; wherein the comparator comprises a comparator transistor and a comparator bias transistor; wherein the current control circuit comprises a current memory transistor, a switch and a capacitor; and wherein the current memory transistor is preceded by at least one bias cascode transistor.

2. The device according to claim 1 wherein the readout circuit is coupled to a pulse width to digital converter is configured to output a digital output signal that is responsive to a width of the pulse; wherein the width of the pulse is indicative of the value of the pixel affected voltage.

3. The device according to claim 1 wherein the readout circuit is configured to be charged to the pixel affected charge without storing a voltage of the pixel.

4. The device according to claim 1 wherein the electrical parameter of the pixel is an electrical parameter of a pixel source follower transistor of the pixel.

5. The device according to claim 1 wherein the electrical parameter of the pixel is a threshold voltage of a pixel source follower transistor of the pixel.

6. The device according to claim 1 wherein the current memory transistor is preceded by a first bias cascode transistor that is coupled in parallel to the comparator transistor and a second bias cascode transistor that is coupled in parallel to the comparator bias transistor.

7. The device according to claim 1 wherein the pixel belongs to a column of pixels and wherein the device further comprises an additional column of pixels and an additional readout circuit; wherein the additional readout circuit is configured read the additional pixel.

8. The device according to claim 7 wherein the readout circuit comprises a buffering transistor for buffering the column of pixels from the additional column of pixels.

9. The device according to claim 1 wherein the readout circuit is coupled to the pixel via a buffering transistor that precedes the comparator and the current control circuit.

10. The device according to claim 9 wherein the buffering transistor is a source follower transistor.

11. The device according to claim 1 comprising a signal generator that is configured to supply the reference signal to the readout circuit.

12. The device according to claim 11 wherein the reference signal is a ramp that scans a range of ramp values during the comparison period.

13. The device according to claim 11 wherein the at least one pulse is multiple pulses; wherein the reference signal comprises multiple ramps that scan a range of ramp values during the comparison period; and wherein the multiple pulses correspond to the multiple ramps.

14. The device according to claim 13 wherein at least one ramp of the multiple ramps has a different slope than another ramp of the multiple ramps.

15. The device according to claim 13 comprising multiple counters that are fed by different clock signals; wherein the multiple counters are configured to count the durations of the multiple pulses.

16. A device comprising a pixel, a first bias current source, and a readout circuit, wherein the pixel is coupled to the readout circuit; wherein the readout circuit comprises a current control circuit and a comparator; wherein the current control circuit is configured to (a) charge the current control circuit to a pixel affected charge using at least a pixel affected current that is indicative of an electrical parameter of the pixel and (b) drain, based on the pixel affected charge, a current control circuit current during a comparison period; wherein the comparator is configured to compare, during the comparison period, between a pixel affected voltage and a reference signal that changes during the comparison period and to provide at least one pulse that has is indicative of a value of the pixel affected voltage; wherein the current control circuit is configured to charge the current control circuit to the pixel affected charge using the pixel affected current and a first bias current supplied by the first bias current source.

17. The device according to claim 16 wherein the current control circuit is configured to charge the current control circuit to the pixel affected charge by a difference current that equals a difference between the pixel affected current and the first bias current.

18. The device according to claim 16 wherein the first bias current has a fixed value.

19. The device according to claim 16 wherein the first bias current source comprises a current mirror.

20. A device comprising a pixel and a readout circuit, wherein the pixel is coupled to the readout circuit; wherein the readout circuit comprises a current control circuit and a comparator; wherein the current control circuit is configured to (a) charge the current control circuit to a pixel affected charge using at least a pixel affected current that is indicative of an electrical parameter of the pixel and (b) drain, based on the pixel affected charge, a current control circuit current during a comparison period; wherein the comparator is configured to compare, during the comparison period, between a pixel affected voltage and a reference signal that changes during the comparison period and to provide at least one pulse that has is indicative of a value of the pixel affected voltage; wherein the readout circuit is coupled to the pixel via a buffering transistor that precedes the comparator and the current control circuit; wherein readout circuit is further coupled to the pixel via a first bias current source that is configured to supply a first bias current of a fixed value.

21. A device comprising a pixel and a readout circuit, wherein the pixel is coupled to the readout circuit; wherein the readout circuit comprises a current control circuit and a comparator; wherein the current control circuit is configured to (a) charge the current control circuit to a pixel affected charge using at least a pixel affected current that is indicative of an electrical parameter of the pixel and (b) drain, based on the pixel affected charge, a current control circuit current during a comparison period; wherein the comparator is configured to compare, during the comparison period, between a pixel affected voltage and a reference signal that changes during the comparison period and to provide at least one pulse that has is indicative of a value of the pixel affected voltage; wherein the comparator consists essentially of a comparator transistor and a comparator bias transistor; wherein the current control circuit comprises a current memory transistor, a switch, one or more bias cascode transistors and a capacitor; and wherein the current memory transistor is preceded by one or more bias cascode transistors.

22. The device according to claim 21 wherein the current control circuit consists essentially of the current memory transistor, the one or more bias cascode transistors, the switch and the capacitor.

23. A device comprising a pixel and a readout circuit, wherein the pixel is coupled to the readout circuit; wherein the readout circuit comprises a current control circuit and a comparator; wherein the current control circuit is configured to (a) charge the current control circuit to a pixel affected charge using at least a pixel affected current that is indicative of an electrical parameter of the pixel and (b) drain, based on the pixel affected charge, a current control circuit current during a comparison period; wherein the comparator is configured to compare, during the comparison period, between a pixel affected voltage and a reference signal that changes during the comparison period and to provide at least one pulse that has is indicative of a value of the pixel affected voltage; wherein the current control circuit comprises a second bias current source and a gain boost transistor.

24. A method for reading a pixel by a readout circuit, the method comprises charging, by a current control circuit of the readout circuit, a current control circuit of the readout circuit to a pixel affected charge by using at least a pixel affected current that is indicative of an electrical parameter of the pixel draining, by the current control unit and based on the pixel affected charge, a current control circuit current during a comparison period; comparing, by a comparator of the readout circuit and during the comparison period, between a pixel affected voltage and a reference signal that changes during the comparison period and to provide at least one pulse that has is indicative of a value of the pixel affected voltage; wherein at least one of the following is true: (a) the comparator comprises a comparator transistor and a comparator bias transistor; the current control circuit comprises a current memory transistor, a switch and a capacitor; and the current memory transistor is preceded by at least one bias cascode transistor; (b) the method comprises charging, by the current control circuit, the current control circuit to the pixel affected charge using the pixel affected current and a first bias current supplied by a first bias current source; (c) the readout circuit is coupled to the pixel via a buffering transistor that precedes the comparator and the current control circuit, and wherein readout circuit is further coupled to the pixel via a first bias current source, wherein the method comprises supplying by the first bias current source, a first bias current of a fixed value; (d) the comparator consists essentially of a comparator transistor and a comparator bias transistor; the current control circuit comprises a current memory transistor, a switch, one or more bias cascode transistors and a capacitor; and the current memory transistor is preceded by one or more bias cascode transistors; (e) the current control circuit comprises a second bias current source and a gain boost transistor.

* * * * *